(No Model.)
E. E. HESS.
GATE.
No. 362,962. Patented May 17, 1887.
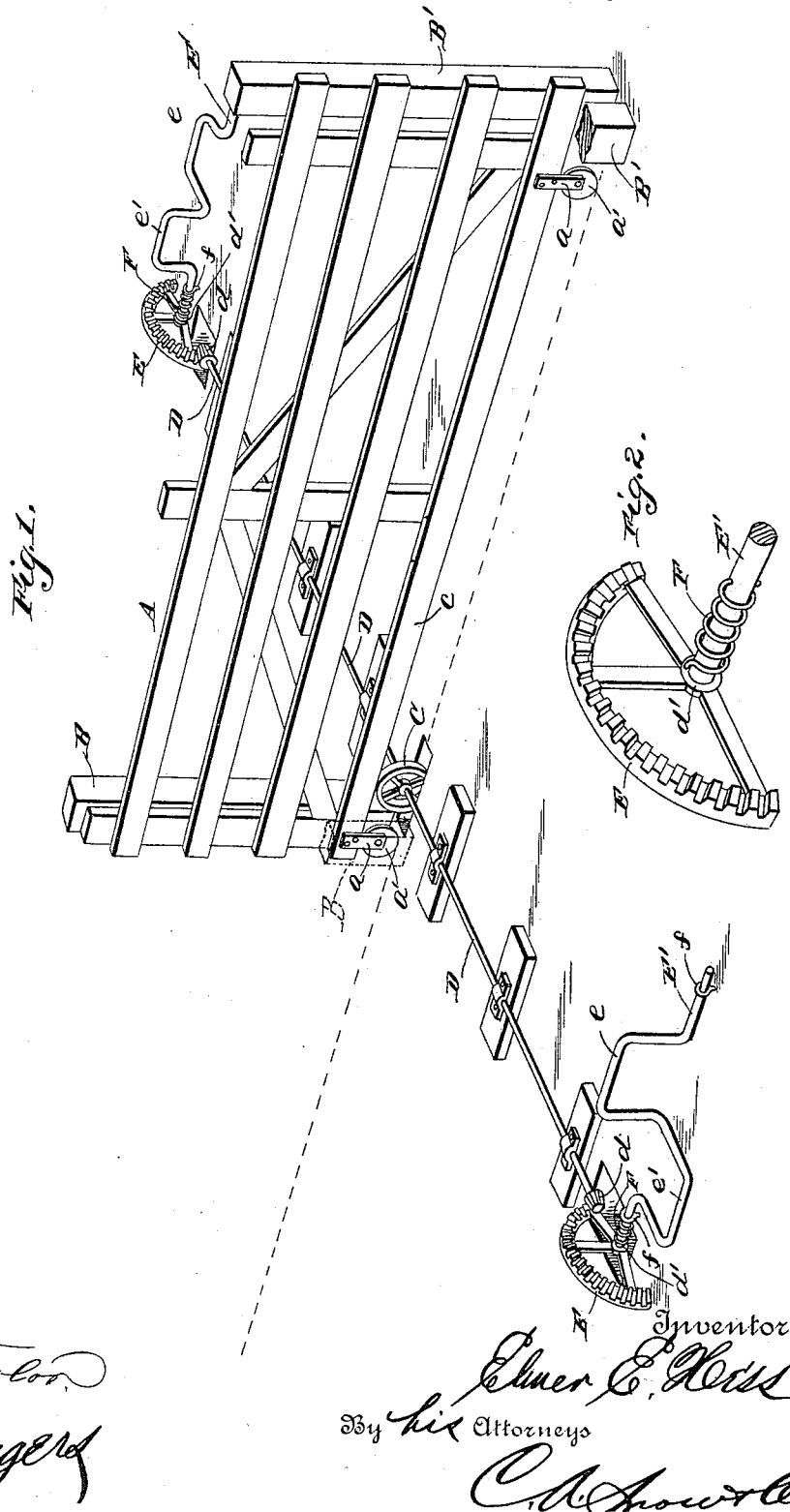

UNITED STATES PATENT OFFICE.

ELMER E. HESS, OF BROOK, INDIANA.

GATE.

SPECIFICATION forming part of Letters Patent No. 362,962, dated May 17, 1887.

Application filed February 14, 1887. Serial No. 227,567. (No model.)

*To all whom it may concern:*

Be it known that I, ELMER E. HESS, a citizen of the United States, residing at Brook, in the county of Newton and State of Indiana, have invented new and useful Improvements in Gates, of which the following is a specification.

My invention relates to improvements in automatically opening and closing gates, and pertains to that class in which the gate is slid on rollers endwise between two posts by means of mechanism actuated by the wheels of an approaching vehicle.

The invention consists in the construction and novel arrangement of parts hereinafter described, illustrated in the drawings, and pointed out in the claim hereto appended.

In the accompanying drawings, Figure 1 represents a perspective view of the gate and actuating mechanism, with some of the parts broken away to more clearly show the action of the latter. Fig. 2 is a perspective view of one of the segmental gears.

Referring to the drawings by letter, A designates a gate having secured to its lower rail at its rear end and near its front and opening end the brackets $a\ a$, having journaled in their bifurcated lower ends the rollers $a'\ a'$, upon which the gate travels over the ground properly leveled when opening and closing.

B B are the two similar posts between which the rear or non-opening end of the gate rests, and B' B' are the similar posts between which the front or opening end of the gate rests in its normal position. The horizontal rails at the front end project somewhat beyond the transverse end rail, and perform the part of latches between the posts, there being neither latch nor hinges to the gate.

C is a large friction-roller, upon the periphery of which the lower rail, $c$, of the gate rests, and which moves the gate in and out by its rotation, produced by mechanism hereinafter described. A proper recess in the ground is made to accommodate the friction-roller. The wheel C is situated a little within the rear end of the gate, and is secured to a long shaft, D, which runs at right angles to the gate and extends equal distances on each side thereof.

On the respective ends of the shaft D are attached the similar gear-wheels $d\ d$, slightly beveled to mesh with the segmental gears or semicircular racks E, each provided with a boss, $d'$, concentric with the rack and secured upon the outer end of a bar or rod, E', journaled in bearings $f\ f$, secured firmly to the ground. Each segmental gear is loose on the corresponding rod E', and is held engaged to the gear-wheel $d$ by the strong coiled spring F, which is secured to the gear and to the rod at opposite ends. This arrangement makes the meshing of the gearing less stiff and the movement of the gate more easy, and prevents jar when the gate is moving.

Upon each bar are made two similar cranks, $e\ e'$, at right angles to each other, so that when one crank is flat on the ground the other is standing vertical. These cranks are rectangular and sufficiently wider than the breadth of the periphery of the wheels of any vehicle.

As shown in Fig. 1, when the gate is closed, the crank $e$ on the nearer side and the crank $e'$ on the farther side are erect, so that the wheel of no vehicle except one going toward the gate could cross and depress either.

Suppose a vehicle is going from the nearer to the farther side. The driver causes a wheel to cross and depress the crank $e$, whereupon the crank $e'$ is raised, and the rotation of the rod E' causes the segmental gear to rotate inward toward the gate, a proper recess having been made in the earth for its reception. The movement of the segmental gear rotates the gear-wheel $d$ and the friction-wheel C in the direction to open the gate, and the gear $d$ on the farther side rotates the corresponding segmental gear in the direction to raise the crank $e$ and depress the crank $e'$ on that side—the position of the cranks when the gate is open. The driver when past the gate causes the wheel to cross and depress the crank $e$ on the farther side, and the action of the mechanism is consequently reversed, closing the gate again. In approaching from the farther side the action is the same, but the cranks $e'$ are the operating-cranks.

Besides possessing the advantages that all sliding gates have over swinging gates, the described mechanism is very cheap and durable, and an ordinary farm-gate can be readily modified for its attachment.

Should the gate in opening meet any obstruction, there will be no breakage, as the friction-roller will move under the gate.

The main feature of my invention resides in the friction-roller bearing against the lower rail of the gate and actuating the gate by frictional contact.

I claim—

The improved automatic gate herein described and shown, comprising the following elements in combination: the gate A, having the rollers a a at the opposite ends of its bottom rail, the friction-wheel C, set in the ground and in frictional contact with the bottom rail of the gate, the shaft D, journaled in suitable bearings secured on the ground and extending from the wheel C on each side of the same, the bevel-pinions d on each end of the said shaft, the double-crank shafts E', the segmental loose gears E upon the ends of the crank-shafts, meshing with the beveled pinions, and the springs F, coiled around the double-crank shafts and having their opposite ends secured to the segmental gears and the crank-shafts, substantially as set forth.

In testimony that I claim the foregoing as my own I have hereto affixed my signature in presence of two witnesses.

ELMER E. HESS.

Witnesses:
 DAVID HESS,
 FRED. R. FORESMAN.